(12) United States Patent
Kawaguchi

(10) Patent No.: US 11,996,213 B2
(45) Date of Patent: May 28, 2024

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Tomoya Kawaguchi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 317 days.

(21) Appl. No.: 17/441,814

(22) PCT Filed: Jan. 17, 2020

(86) PCT No.: PCT/JP2020/001401
§ 371 (c)(1),
(2) Date: Sep. 22, 2021

(87) PCT Pub. No.: WO2020/195039
PCT Pub. Date: Oct. 1, 2020

(65) Prior Publication Data
US 2022/0199283 A1   Jun. 23, 2022

(30) Foreign Application Priority Data

Mar. 28, 2019   (JP) ................. 2019-064326

(51) Int. Cl.
*H01B 7/02* (2006.01)
*H01B 7/42* (2006.01)
*H02G 3/04* (2006.01)

(52) U.S. Cl.
CPC ............ *H01B 7/0216* (2013.01); *H01B 7/42* (2013.01); *H02G 3/04* (2013.01)

(58) Field of Classification Search
CPC .... B60R 16/0215; H01B 7/0216; H01B 7/42; H02G 3/04; H02G 3/32
See application file for complete search history.

(56) References Cited

U.S. PATENT DOCUMENTS 5,402,970 A * 4/1995 Fujishita ............... F16B 2/08
248/71
5,433,625 A * 7/1995 Tsuji ....................... H01R 13/73
439/400

(Continued)

FOREIGN PATENT DOCUMENTS

JP   2016-054030 A   4/2016
JP   2017-034820 A   2/2017

(Continued)

OTHER PUBLICATIONS

Apr. 14, 2020 Search Report issued in International Patent Application No. PCT/JP2020/001401.

*Primary Examiner* — William H. Mayo, III
*Assistant Examiner* — Rhadames Alonzo Miller
(74) *Attorney, Agent, or Firm* — Oliff PLC

(57) ABSTRACT

A wire harness, including: a wire; an outer sheath that covers a portion of an outer circumferential surface of the wire in a circumferential direction; and a fastener that fixes the outer sheath to an outer circumference of the wire, wherein: the outer sheath includes a first section and a second section that each include an opening that opens in a direction orthogonal to an axis line direction of the wire, and the fastener fixes the outer sheath to the outer circumference of the wire with at least one end surface of the first section in the circumferential direction and at least one end surface of the second section in the circumferential direction facing one another and separated from one another.

8 Claims, 5 Drawing Sheets

(56) References Cited

U.S. PATENT DOCUMENTS

| | | | | |
|---|---|---|---|---|
| 6,460,642 B1 * | 10/2002 | Hirano | ............ | B60K 6/40 |
| | | | | 903/952 |
| 9,522,640 B2 | 12/2016 | Kanagawa | | |
| 2004/0154817 A1 * | 8/2004 | Sudo | ............ | H02G 3/0418 |
| | | | | 174/481 |
| 2007/0215757 A1 * | 9/2007 | Yuta | ............ | F16L 55/035 |
| | | | | 248/68.1 |
| 2011/0061932 A1 * | 3/2011 | Ogawa | ............ | B60R 16/0207 |
| | | | | 174/72 A |
| 2013/0037321 A1 * | 2/2013 | Murata | ............ | B60R 16/0215 |
| | | | | 174/72 A |
| 2013/0097818 A1 * | 4/2013 | Fukumoto | ............ | H02G 3/32 |
| | | | | 24/305 |
| 2014/0190742 A1 * | 7/2014 | Kajiwara | ............ | B29C 43/305 |
| | | | | 174/72 A |
| 2017/0028945 A1 * | 2/2017 | Kimura | ............ | B60R 16/0215 |

FOREIGN PATENT DOCUMENTS

| | | | |
|---|---|---|---|
| JP | 2017-139881 A | | 8/2017 |
| JP | 2017139881 A | * | 8/2017 |

* cited by examiner

WIRE HARNESS

BACKGROUND

The present disclosure relates to a wire harness.

A known wire harness used in vehicles, such as hybrid vehicles and electric vehicles, is provided with wires that electrically connect electric devices, such as a high voltage batteries, inverters, and the like (see JP 2016-54030A, for example). Such wire harnesses are able to protect wires by covering the wires with a cylindrical outer sheath member.

SUMMARY

However, in the above-described electric devices, i.e., the high voltage inverters, batteries, and the like, used in vehicles, such as hybrid vehicles and electric vehicles, a large current of hundreds of ampere flows through the wires, for example. When a large current flows through the wires, a large amount of heat is generated in the wires, making the wires susceptible to an increase in the temperature. Thus, there is a demand for an enhancement in the heat dissipation of wire harnesses.

An exemplary aspect of the disclosure provides a wire harness with enhanced heat dissipation.

A wire harness of the present disclosure includes: a wire; an outer sheath that covers a portion of an outer circumferential surface of the wire in a circumferential direction; and a fastener that fixes the outer sheath to an outer circumference of the wire, wherein: the outer sheath includes a first section and a second section that each include an opening that opens in a direction orthogonal to an axis line direction of the wire, and the fastener fixes the outer sheath to the outer circumference of the wire with at least one end surface of the first section in the circumferential direction and at least one end surface of the second section in the circumferential direction facing one another and separated from one another.

According to a wire harness of the present disclosure, an effect of enhancing heat dissipation is achieved.

DETAILED DESCRIPTION OF EMBODIMENTS

Description of the Present Disclosure

Figure 1:
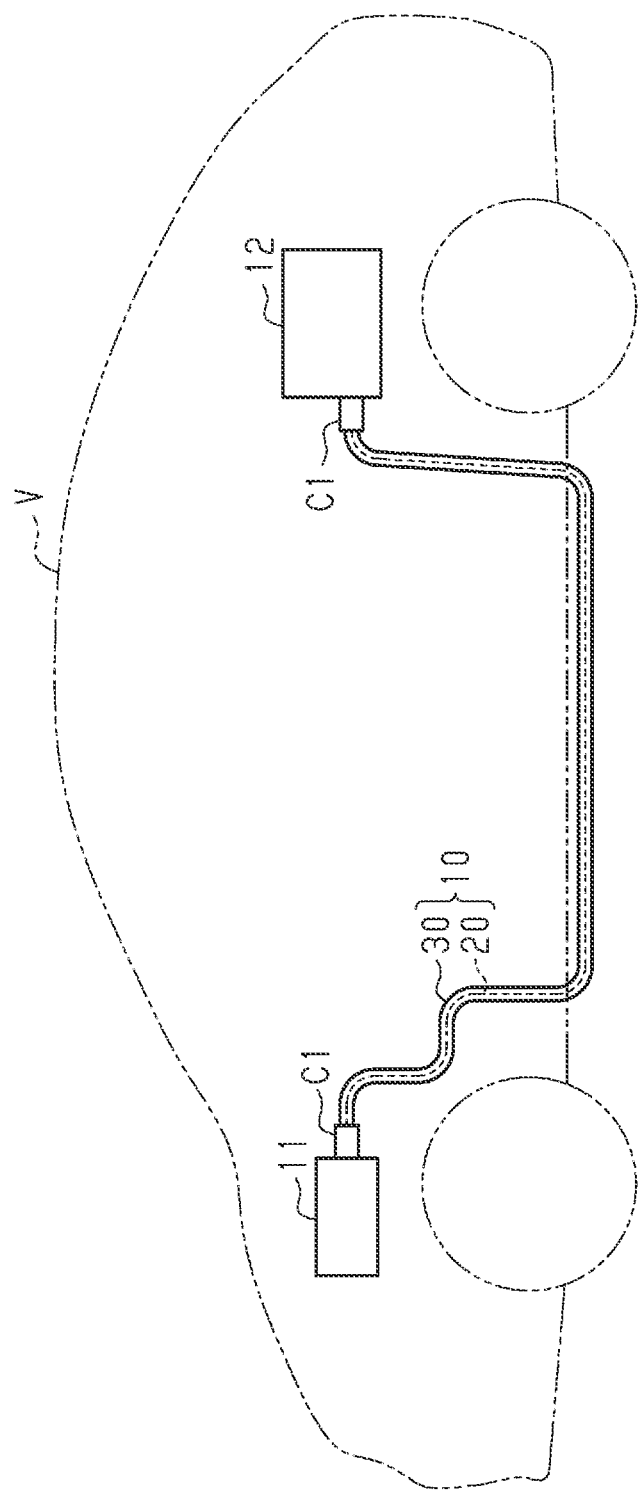
FIG. 1 is a schematic configuration diagram of a wire harness according to an embodiment.

Firstly, embodiments of the present disclosure will be listed and described.

1. A wire harness of the present disclosure includes:
a wire;
an outer sheath member that covers a portion of an outer circumferential surface of the wire in a circumferential direction; and
a fixing member that fixes the outer sheath member to an outer circumference of the wire, wherein
the outer sheath member includes a first section including an opening portion as seen in a lateral cross-sectional shape and a second section including an opening portion as seen in a lateral cross-sectional shape, and
the fixing member fixes the outer sheath member to the outer circumference of the wire with at least one end surface of the first section in the circumferential direction and at least one end surface of the second section in the circumferential direction facing one another and separated from one another.

According to this configuration, a gap is formed between the first section and the second section, and a portion of the outer circumferential surface of the wire is exposed from the outer sheath member at this gap. This allows the heat generated at the wire to be dissipated outside of the outer sheath member from the gap between the first section and the second section. In this manner, compared to a configuration in which the outer circumference of the wire is entirely enclosed by an outer sheath member in the circumferential direction, the heat generated at the wire can be suppressed from being trapped inside the outer sheath member, and the heat generated at the wire can be efficiently dissipated to the atmosphere outside the outer sheath member via the gap described above. Thus, the heat generated at the wire can be efficiently dissipated, and the heat dissipation of the wire harness can be enhanced.

Note that in the present specification, the expression "face (facing)" includes in its meaning both a state in which both end surfaces in the circumferential direction are fully facing the front of the other end surface and a state in which the end surfaces in the circumferential direction are facing one another at a slant relative to the other.

2. Preferably, a first elastic body is further provided between an inner circumferential surface of the first section and the outer circumferential surface of the wire, wherein
the first elastic body is in close contact with the outer circumferential surface of the wire and in close contact with the inner circumferential surface of the first section,
the first elastic body is made from a material with a lower elastic modulus than the first section, and
the first elastic body is made from a material with a higher thermal conductivity than an air layer.

According to this configuration, the first elastic body made from a material with a lower elastic modulus than the first section is provided between the first section and the wire. By the first elastic body elastically deforming, it can absorb the expansion and the contraction of the wire. In this manner, compared to a configuration in which the first section comes into direct contract with the outer circumferential surface of the wire, when the wire expands or contracts, the close contact state between the first section and the wire with the first elastic body disposed therebetween can be maintained. This can prevent an air layer, i.e., a heat insulating layer, being formed between the outer circumferential surface of the wire and the inner circumferential surface of the first section. As a result, the thermal resistance between the outer circumferential surface of the wire and the inner circumferential surface of the first section can be decreased. Thus, the heat generated at the wire can be suppressed from being trapped inside the outer sheath member, and the heat generated at the wire can be dissipated efficiently to the atmosphere from the outer circumferential surface of the first section. Thus, the heat generated at the wire can be efficiently dissipated, and the heat dissipation of the wire harness can be enhanced.

3. Preferably, the wire includes a core wire and an insulating covering that covers an outer circumference of the core wire; and the first elastic body is made from a material with a higher thermal conductivity than the insulating covering.

According to this configuration, the thermal resistance between the outer circumferential surface of the insulating covering and the inner circumferential surface of the first section can be further decreased. In this manner, the heat generated at the wire can be efficiently thermally conducted to the first section via the first elastic body. Thus, the heat generated at the wire can be dissipated efficiently to the atmosphere from the outer circumferential surface of the first section, and the heat dissipation of the wire harness can be enhanced.

4. Preferably, the first section is made from a metal material;

a length of the first elastic body in the circumferential direction is greater than a length of the first section in the circumferential direction; and end portions of the first elastic body in the circumferential direction are exposed from end portions of the first section in the circumferential direction.

According to this configuration, because the edges of the ends in the circumferential direction of the first section come into contact with the first elastic body, damage by the edges to the outer circumferential surface of the wire can be minimized or prevented.

5. Preferably, a length of the first elastic body in the axis line direction is greater than a length of the first section in the axis line direction, and end portions of the first elastic body in the axis line direction are exposed from end portions of the first section in the axis line direction.

According to this configuration, because the edges of the ends in the axis line direction of the first section come into contact with the first elastic body, damage by the edges to the outer circumferential surface of the wire can be minimized or prevented.

6. Preferably, a second elastic body is further provided between an inner circumferential surface of the second section and the outer circumferential surface of the wire, wherein the second elastic body is in close contact with the outer circumferential surface of the wire and in close contact with the inner circumferential surface of the second section, the second elastic body is made from a material with a lower elastic modulus than the second section, and the second elastic body is made from a material with a higher thermal conductivity than an air layer.

According to this configuration, the second elastic body made from a material with a lower elastic modulus than the second section is provided between the second section and the wire. By the second elastic body elastically deforming, it can absorb the expansion and the contraction of the wire. In this manner, compared to a configuration in which the second section comes into direct contract with the outer circumferential surface of the wire, when the wire expands or contracts, the close contact state between the second section and the wire with the second elastic body disposed therebetween can be maintained. This can prevent an air layer, i.e., a heat insulating layer, being formed between the outer circumferential surface of the wire and the inner circumferential surface of the second section. As a result, the thermal resistance between the outer circumferential surface of the wire and the inner circumferential surface of the second section can be decreased. Thus, the heat generated at the wire can be suppressed from being trapped inside the outer sheath member, and the heat generated at the wire can be dissipated efficiently to the atmosphere from the outer circumferential surface of the second section. Thus, the heat generated at the wire can be efficiently dissipated, and the heat dissipation of the wire harness can be enhanced.

7. Preferably, an elastic body is further provided on an outer circumferential surface of the first section, wherein the elastic body is configured to press the first section toward the wire, and the elastic body is made from a material with a lower elastic modulus than the first section.

According to this configuration, the first section is pressed toward the wire by the elastic body made from a material with a lower elastic modulus than the first section. In this manner, the degree of close contact between the outer circumferential surface of the wire and the inner circumferential surface of the first section can be increased. Accordingly, the heat generated at the wire can be efficiently dissipated to the atmosphere from the outer circumferential surface of the first section.

8. Preferably, the wire includes a linear portion and a bent portion provided on one end portion of the linear portion, the first section is provided at a portion of the linear portion closer to a bend inner side of the bent portion, the second section is provided at a portion of the linear portion closer to a bend outer side of the bent portion, and an end surface on the bent portion side of end surfaces of the first section in the axis line direction is provided at a position further separated from the bent portion than an end surface on the bent portion side of end surfaces of the second section in the axis line direction.

According to this configuration, the end surface of the first section provided at the portion closer to the bend inner side of the bent portion is provided at a position separated from the bend inner side. Thus, in a case where the wire harness vibrates or swings, for example, the bent portion (in particular, the bend inner side) of the wire can be prevented from coming into contact with the end surface of the first section in the axis line direction. In this manner, damage to the outer circumferential surface of the wire can be suitably minimize or prevented.

9. Preferably, the fixing member includes a holding portion that holds the wire and the outer sheath member, and a fixing portion provided connected to the holding portion, the fixing portion being configured to be fixed to a fixing target portion. According to this configuration, the heat generated at the wire can pass through the outer sheath member and the fixing member and be efficiently transferred to the fixing target portion. Thus, the heat generated at the wire can be efficiently dissipated, and the heat dissipation of the wire harness can be enhanced.

DESCRIPTION OF EMBODIMENTS

A specific example of a wire harness according to the present disclosure will be described below with reference to the drawings. In the drawings, components of the configuration may be exaggerated or simplified for the sake of convenience. Also, the dimensions and proportions of the components may be different in each diagram. Note that the present disclosure is not limited to these examples and is defined by the scope of the claims, and all modifications that are equivalent to or within the scope of the claims are included. The terms "orthogonal" and "uniform" used in the present specification do not mean only strictly orthogonal and uniform and also include substantially orthogonal and uniform within a range in which the advantageous effects of the present embodiment can be achieved.

Overall Configuration of Wire Harness 10

A wire harness 10 illustrated in FIG. 1, electrically connects two or three or more electric devices (devices). The wire harness 10, for example, electrically connects an inverter 11 installed in a front portion of a vehicle V, such as a hybrid vehicle or an electric vehicle, and a high voltage battery 12 installed further to the rear of the vehicle than the inverter 11. The wire harness 10 is routed, for example, under the floor of the vehicle. The inverter 11 is connected to a motor (not illustrated) for driving a wheel which acts as the power source for driving the vehicle. The inverter 11 generates an alternating current from the direct current of the high voltage battery 12 and supplies the alternating current to the motor. The high voltage battery 12, for example, is a battery capable of supplying voltage of hundreds of volts.

The wire harness 10 includes one or more wires 20, a pair of connectors C1 attached to the end portions of the wire 20, and an outer sheath member 30 (outer sheath) enclosing the outer circumference of the wire 20. One end portion of the wire 20 is connected to the inverter 11 via the connector C1, and the other end portion of the wire 20 is connected to the high voltage battery 12 via the connector C1. The wire 20 is a high voltage wire capable of supporting high voltage and large current, for example. The wire 20, for example may be a shielded wire with an electromagnetic shield structure, or may be a non-shielded wire without an electromagnetic shield structure.

Configuration of Wire 20

Figure 2:
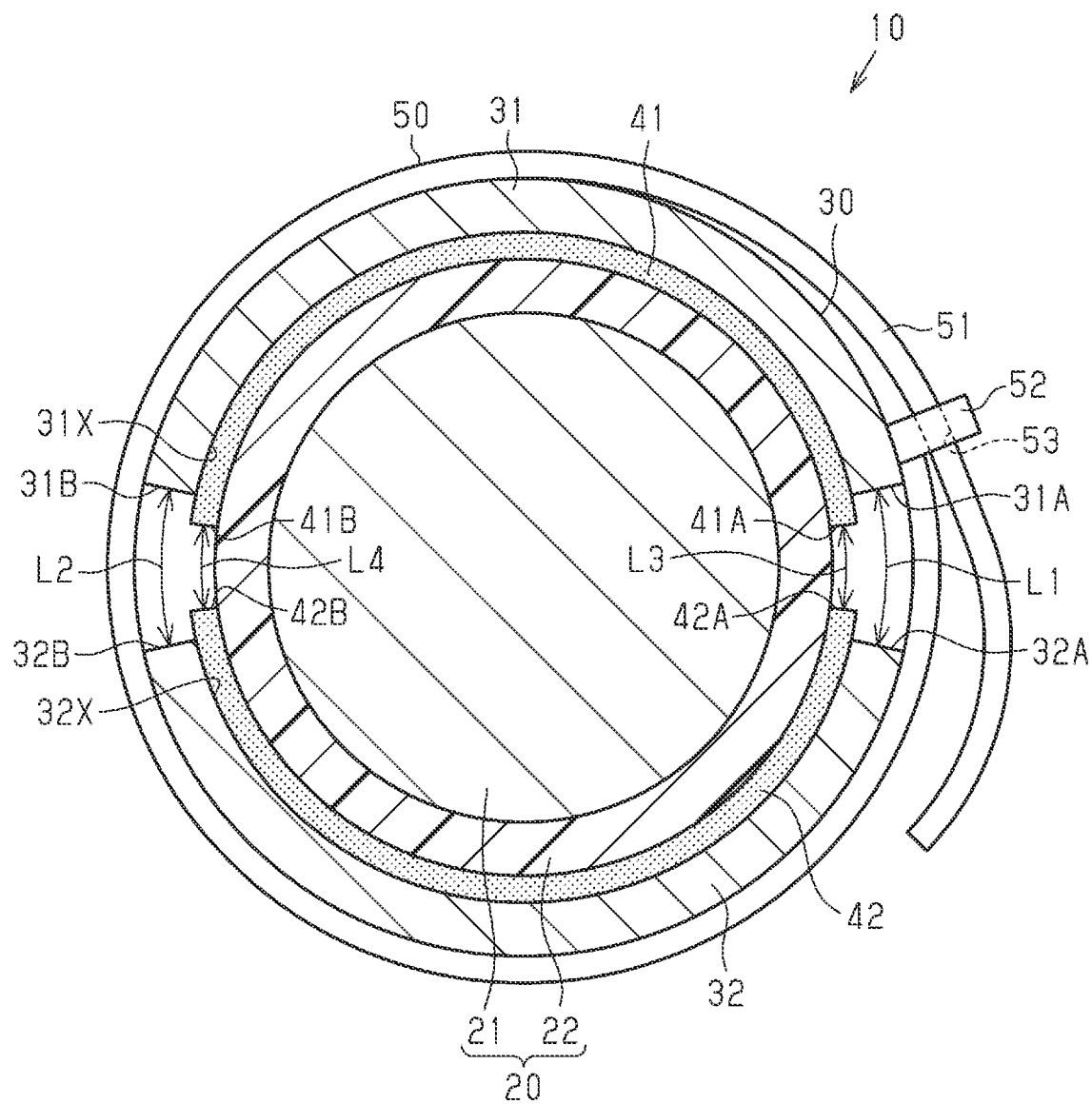
FIG. 2 is a schematic transverse cross-sectional view (a cross-sectional view taken along line 2-2 in FIG. 3) illustrating a wire harness according to an embodiment.

As illustrated in FIG. 2, the wire 20 includes a core wire 21 made of a conductor and an insulating covering 22 that covers the outer circumference of the core wire 21. As the core wire 21, for example, a stranded wire including a plurality of individual metal wires twisted together, a column-like conductor including a single column-like metal rod with a hollow structure inside, a cylindrical conductor with a hollow structure inside, or the like may be used. A single core wire or a bus bar may be used as the conductor, for example. Also, as the core wire 21, a combination of a stranded wire, a column-like conductor, and/or a cylindrical conductor may be used. The core wire 21 of the present embodiment is a single core wire. A metal material, such as a copper-based material or an aluminum-based material may be used as the material of the core wire 21, for example. The core wire 21 is formed by extrusion molding, for example.

The cross-sectional shape of the core wire 21 when the core wire 21 is sectioned along a plane orthogonal to the length direction may be a discretionary shape. In other words, the lateral cross-sectional shape of the core wire 21 may be a discretionary shape. The lateral cross-sectional shape of the core wire 21, for example, is formed in a circular shape, a semicircular shape, a polygonal shape, a square shape, or a flat shape. In the present specification, "flat/flat shape" includes in its meaning a rectangular shape, an elliptical shape, and an ellipse, for example. Also, "rectangle/rectangular" in the present specification refers to a shape with a long side and a short side, with a square being excluded from its meaning. Furthermore, "rectangle/rectangular" in the present specification includes in its meaning a shape with a chamfered edge portion and a shape with a rounded edge portion. The lateral cross-sectional shape of the core wire 21 of the present embodiment is formed in a circular shape.

The insulating covering 22, for example, entirely covers the outer circumferential surface of the core wire 21. The insulating covering 22, for example, is formed by a synthetic resin insulating material or the like. The insulating covering 22, for example, may be formed on the core wire 21 via extrusion molding (extrusion coating).

Hereinafter, when simply "circumferential direction" is mentioned, this means the circumferential direction of the center axis line of the wire 20, and when simply "axis line direction" is mentioned, this means the direction in which the center axis line of the wire 20 runs.

Figure 3:
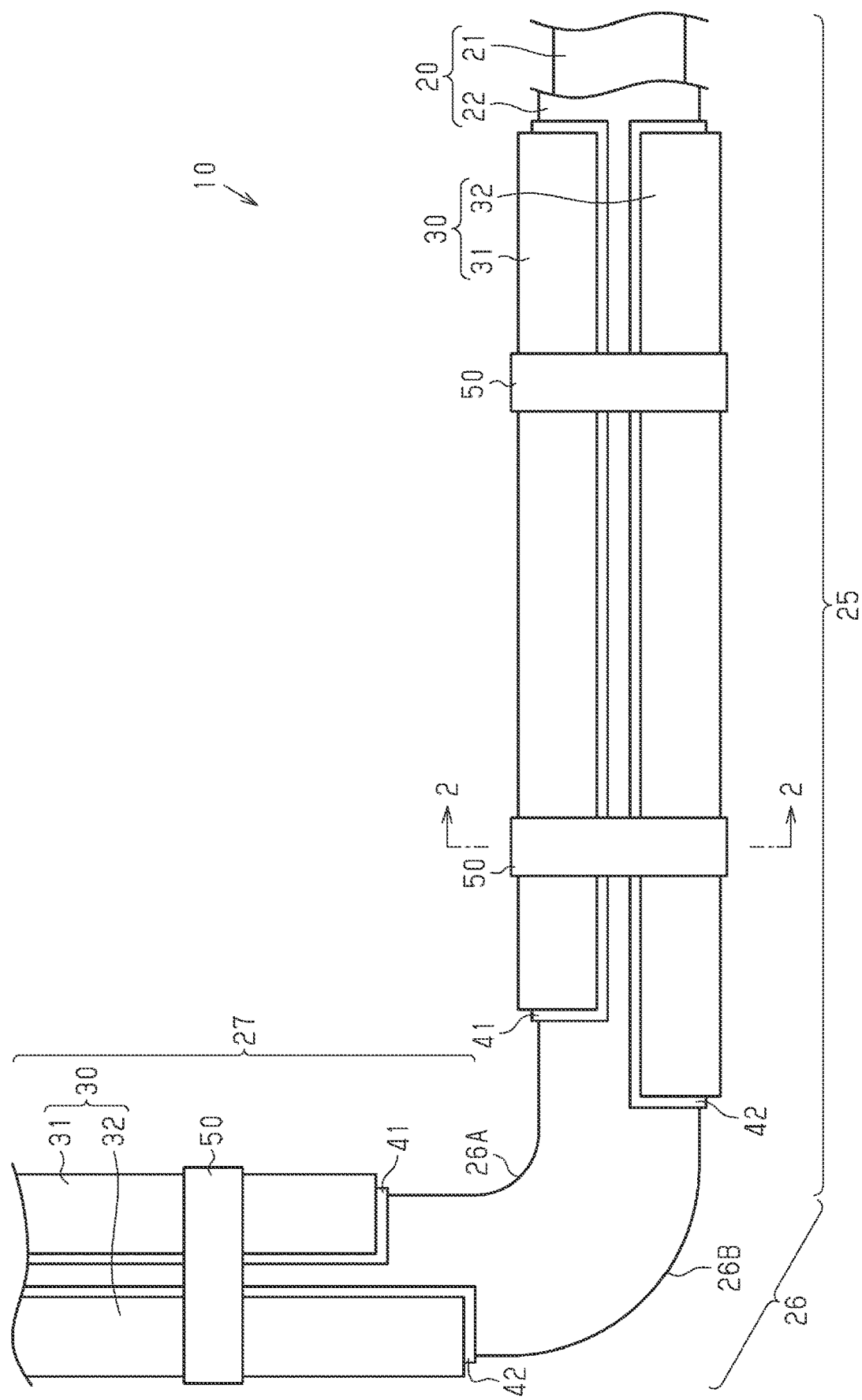
FIG. 3 is a schematic side view illustrating a wire harness according to an embodiment.

As illustrated in FIG. 3, the wire 20, for example, is formed bent in a two-dimensional manner or a three-dimensional manner. For example, the wire 20 is formed bent in a predetermined shape corresponding to the routing path of the wire harness 10. The wire 20 of the present embodiment includes a linear portion 25 extending in the vehicle longitudinal direction (the left-and-right direction in the diagram), a bent portion 26 provided at one end portion of the linear portion 25, and a linear portion 27 extending upward in the vehicle vertical direction (the up-and-down direction in the diagram) from the bent portion 26.

Configuration of Outer Sheath Member 30

The outer sheath member 30 is formed covering the outer circumference of the wire 20, for example. Also, one outer sheath member 30 is provided for each wire 20, for example. In other words, each outer sheath member 30 houses one wire 20. Thus, for example, in a case where the wire harness 10 includes a plurality of the wires 20, the wire harness 10 is routed with a plurality of arranged outer sheath members 30 each housing one wire 20.

The outer sheath member 30 is formed covering a portion of the outer circumference of the wire 20 in the circumferential direction. The outer sheath member 30, for example, is formed to be long in length, extending along the path along which the wire 20 is routed. In other words, the outer sheath member 30 is formed to be long in length, extending along the axis line direction (length direction) of the wire 20. The outer sheath member 30, for example, is provided partially along a portion of the axis line direction of the wire 20. For example, one outer sheath member 30 may be provided for each wire 20, or a plurality of the outer sheath members 30 may be provided. For example, a plurality of sections (for example, a linear portion and a bent portion) of the wire 20 may be covered by one outer sheath member 30, or one section (for example, only a linear portion) of the wire 20 may be covered by a plurality of outer sheath members 30. Also, the outer sheath member 30 may be formed of only a linear portion or may include a bent portion. In the example illustrated in FIG. 3, two outer sheath members 30 are attached to one wire 20. The outer sheath members 30 are each formed of only a linear portion and are provided on the linear portions 25, 27 of the wire 20. In other words, the outer sheath member 30 of the present embodiment is not provided on the bent portion 26 of the wire 20.

Detail Configuration of Outer Sheath Member 30

Next, the detailed configuration of the outer sheath member 30 will be described. The outer sheath member 30 provided on the linear portion 25 and the outer sheath member 30 provided on the linear portion 27 have the same structure. Thus, hereinafter, the detailed configuration of the outer sheath member 30 provided on the linear portion 25 will be described, and a description of the configuration of the outer sheath member 30 provided on the linear portion 27 will be omitted.

As illustrated in FIG. 2, the outer sheath member 30 includes a plurality of sections 31, 32. The section 31 includes an opening portion 31X (opening) that opens in one direction (downward direction in FIG. 2) in reference to the lateral cross-sectional shape. The opening portion 31X is formed opening in a direction orthogonal to the length direction of the wire 20. The section 32 includes an opening portion 32X that opens in one direction (upward direction in FIG. 2) in reference to the lateral cross-sectional shape. The opening portion 32X is formed opening in a direction orthogonal to the length direction of the wire 20. The lateral cross-sectional shape of the sections 31, 32 is formed as an arc shape or a U-shape, for example. In the present embodiment, the lateral cross-sectional shape of the sections 31, 32 is formed as a semicircular arc-shape extending along the entire length of the outer sheath member 30 in the axis line direction when the sections 31, 32 are not attached to the wire 20, i.e., when the sections 31, 32 are in a natural state.

The section 31 is provided covering the upper portion of the outer circumferential surface of the wire 20 in the vehicle vertical direction, for example. For example, the upper portion of the outer circumferential surface of the wire 20 in the vehicle vertical direction is housed in the opening portion 31X of the section 31. The section 32 is provided covering the lower portion of the outer circumferential surface of the wire 20 in the vehicle vertical direction, for example. For example, the lower portion of the outer circumferential surface of the wire 20 in the vehicle vertical direction is housed in the opening portion 32X of the section 32. In this manner, the plurality of sections 31, 32 are provided sandwiching one wire 20 from the above and below as in the diagram. However, a portion of the outer circumferential surface of the wire 20 in the circumferential direction is not covered by the sections 31, 32 (i.e., the outer sheath member 30).

In the present specification, the direction of the sections 31, 32 along the axis line direction of the wire 20 is referred to as the "axis line direction of the sections 31, 32 (outer sheath member 30)", and the direction of the sections 31, 32 along the circumferential direction of the wire 20 is referred to as the "circumferential direction of the sections 31, 32 (outer sheath member 30)". Also, in the present specification, the direction of the sections 31, 32 along the radial direction of the wire 20 is referred to as the "radial direction or thickness direction of the sections 31, 32".

Material of Sections 31, 32

As the material of the sections 31, 32, a resin material with electrical conductivity, a resin material without electrical conductivity, or a metal material may be used. A synthetic resin, such as polyolefin, polyamide, polyester, or ABS resin, may be used as the resin material. A metal material, such as a copper-based material, an aluminum-based material, or an iron-based material may be used as the metal material, for example. The material of the section 31 and the material of the section 32 may be the same material or may be different. As the material of the sections 31, 32 of the present embodiment, an aluminum-based metal material may be used. The outer sheath member 30 including the sections 31, 32 with such a configuration has a protective function for protecting the wire 20 from flying objects and the like, an electromagnetic shielding function for protecting the wire 20 from electromagnetic waves, and a heat dissipation function for dissipating heat generated at the wire 20 or the like.

The sections 31, 32, for example, are members with a higher bending rigidity than the wire 20. Thus, the sections 31, 32 are more difficult to bend than the wire 20. The sections 31, 32 of the present embodiment, for example, are formed of a material with a rigidity sufficient to maintain the path of the wire 20. The sections 31, 32 with such a configuration have, in addition to the protective function, the electromagnetic shielding function, and the heat dissipation function described above, a path restricting function for restricting the path of the wire 20.

The sections 31, 32 may be formed by extrusion molding, for example. The sections 31, 32 with such a configuration, for example, are formed with a constant lateral cross-sectional shape along the entire length in the axis line direction.

Configuration of Section 31

The section 31 includes an inner circumferential surface opposite to the outer circumferential surface of the wire 20, an outer circumferential surface on the side opposite the inner circumferential surface, and end surfaces 31A, 31B provided on the end portions of the section 31 in the circumferential direction. The inner circumferential surface and the outer circumferential surface of the section 31, for example, are formed extending in the axis line direction and the circumferential direction of the section 31. The inner circumferential surface and the outer circumferential surface of the section 31 are formed extending along the outer circumferential surface of the wire 20, for example. The inner circumferential surface and the outer circumferential surface of the section 31 of the present embodiment are formed with a semicircular arc-shaped lateral cross-section. For example, the inner circumferential surface and the outer circumferential surface of the section 31 are formed curved in an arc shape projecting outward (upward direction in the diagram) in the radial direction of the section 31.

The end surfaces 31A, 31B of the section 31 are provided connecting the inner circumferential surface and the outer circumferential surface of the section 31. The end surfaces 31A, 31B of the section 31, for example, are formed extending in a direction (the thickness direction of the section 31, for example) that intersects the circumferential direction of the section 31. The section 31, for example, is formed with a uniform thickness along the entire length in the axis line direction and the circumferential direction of the section 31.

Configuration of Section 32

The section 32 includes an inner circumferential surface opposite to the outer circumferential surface of the wire 20, an outer circumferential surface on the side opposite the inner circumferential surface, and end surfaces 32A, 32B provided on the end portions of the section 32 in the circumferential direction. The inner circumferential surface and the outer circumferential surface of the section 32, for example, are formed extending in the axis line direction and the circumferential direction of the section 32. The inner circumferential surface and the outer circumferential surface of the section 32 are formed extending along the outer circumferential surface of the wire 20, for example. The inner circumferential surface and the outer circumferential surface of the section 32 of the present embodiment are formed with a semicircular arc-shaped lateral cross-section. For example, the inner circumferential surface and the outer circumferential surface of the section 32 are formed curved in an arc shape projecting outward (downward direction in the diagram) in the radial direction of the section 32.

The end surfaces 32A, 32B of the section 32 are provided connecting the inner circumferential surface and the outer circumferential surface of the section 32. The end surfaces 32A, 32B of the section 32, for example, are formed extending in a direction (the thickness direction of the section 32, for example) that intersects the circumferential direction of the section 32. The section 32, for example, is formed with a uniform thickness along the entire length in the axis line direction and the circumferential direction.

Configuration of Sections 31, 32

The section 31 and the section 32 are attached to the outer circumference of the wire 20 in a state with the end surfaces 31A, 32A facing one another and the end surfaces 31A, 32A separated from one another in the circumferential direction. Also, the section 31 and the section 32 are attached to the outer circumference of the wire 20 in a state with the end surfaces 31B, 32B facing one another and the end surfaces 31B, 32B separated from one another in the circumferential direction. In other words, the sections 31, 32 of the present embodiment are attached to the outer circumference of the wire 20 in a state where, at the end portions in the circumferential direction, the end surfaces 31A, 32A are separated from one another and the end surfaces 31B, 32B are separated from one another.

The end surface 31A of the section 31 and the end surface 32A of the section 32 are provided with a predetermined gap L1 therebetween in the circumferential direction. The end surface 31A and the end surface 32A are provided with the gap L1 where the end surfaces 31A, 32A do not come into contact with one another. The end surface 31B of the section 31 and the end surface 32B of the section 32 are provided with a predetermined gap L2 therebetween in the circumferential direction. The end surface 31B and the end surface 32B are provided with the gap L2 where the end surfaces 31B, 32B do not come into contact with one another. The gaps L1, L2, for example, are set to a length so that the end surfaces 31A, 32A do not comes into contact with one another and the end surfaces 31B, 32B do not comes into contact with one another even when the wire 20 and the outer sheath member 30 undergo thermal expansion at the maximum temperature (for example, approximately 80° C.) expected in the use environment of the vehicle V (see FIG. 1). Also, the gaps L1, L2, for example, are set to a length so as to not affect the electromagnetic shielding function of the outer sheath member 30. The gap L1 may be the same length as the gap L2, for example, or may be a different length from the gap L2.

At the gap between the end surface 31A and the end surface 32A and at the gap between the end surface 31B and the end surface 32B, the outer circumferential surface of the wire 20 is not covered by the outer sheath member 30. Thus, at the gap between the end surfaces 31A, 32A and at the gap between the end surfaces 31B, 32B, the outer circumferential surface of the wire 20 is exposed from the outer sheath member 30 (i.e., the sections 31, 32). In other words, the outer circumferential surface of the wire 20 is exposed at at least one portion in the circumferential direction from the outer sheath member 30.

Looking at it a different way, the combined length of the length of the section 31 in the circumferential direction and the length of the section 32 in the circumferential direction is set to a length less than the length of the outer circumferential surface of the wire 20 (in this case, the insulating covering 22) in the circumferential direction.

As illustrated in FIG. 3, the sections 31, 32, for example, are formed extending along the axis line direction of the wire 20 at the linear portion 25. The dimension of the section 31 in the axis line direction and the dimension of the section 32 in the axis line direction may be the same in terms of length or may be different in terms of length. In the present embodiment, the dimension of the section 31 in the axis line direction is set to a dimension less than the dimension of the section 32 in the axis line direction.

In the wire 20 of the present embodiment, the bent portion 26 is formed at one end portion of the linear portion 25, and the linear portion 27 is formed extending upward in the vehicle vertical direction from the bent portion 26. Thus, at the linear portion 25, the upper portion in the vehicle vertical direction corresponds to the portion closer to a bend inner side 26A of the bent portion 26, and the lower portion in the vehicle vertical direction corresponds to the portion closer to a bend outer side 26B of the bent portion 26. Accordingly, at the linear portion 25, the wire 20 at the portion closer to the bend inner side 26A of the bent portion 26 is covered with the section 31, and the wire 20 at the portion closer to the bend outer side 26B of the bent portion 26 is covered with the section 32. Also, the end surface of the section 31 in the axis line direction is provided at a position separated from the bent portion 26 moreso than the end surface of the section 32 in the axis line direction.

Note that regarding the outer sheath member 30 provided on the linear portion 27, in a similar manner, the section 31 is provided covering the wire 20 at the portion closer to the bend inner side 26A of the bent portion 26, and the section 32 is provided covering the wire 20 at the portion closer to the bend outer side 26B of the bent portion 26. Also, the end surface of the section 31 in the axis line direction is provided at a position separated from the bent portion 26 more so than the end surface of the section 32 in the axis line direction.

General Configuration of Elastic Bodies 41, 42

As illustrated in FIG. 2, the wire harness 10, for example, includes elastic bodies 41, 42. The elastic body 41, for example, is provided between the outer circumferential surface of the wire 20 and the inner circumferential surface of the section 31. The elastic body 42, for example, is provided between the outer circumferential surface of the wire 20 and the inner circumferential surface of the section 32. The elastic body 41, for example, has elasticity that allows it to expand or contract conforming to expansion or contraction of the wire 20 without forming any gaps between the section 31 and the wire 20. The elastic body 42, for example, has elasticity that allows it to expand or contract conforming to expansion or contraction of the wire 20 without forming any gaps between the section 32 and the wire 20. For example, the elastic bodies 41, 42 have elasticity that allow them to absorb amounts of contraction and amounts of expansion of the wire 20.

In the present specification, the direction of the elastic bodies 41, 42 along the axis line direction of the wire 20 is referred to as the "axis line direction of the sections elastic bodies 41, 42", and the direction of the elastic bodies 41, 42 along the circumferential direction of the wire 20 is referred to as the "circumferential direction of the elastic bodies 41, 42". Also, in the present specification, the direction of the elastic bodies 41, 42 along the radial direction of the wire 20 is referred to as the "radial direction or thickness direction of the elastic bodies 41, 42".

Material of Elastic Bodies 41, 42

The elastic bodies 41, 42 may be made of a material with a lower elastic modulus than the material constituting the sections 31, 32, for example. As the material of the elastic bodies 41, 42, a viscoelastic member that has higher viscoelasticity and is softer than the material constituting the sections 31, 32 may be used. Also, as the material of the elastic bodies 41, 42, for example, a material with a higher thermal conductivity than an air layer may be used. As the material of the elastic bodies 41, 42, for example, a material with a higher thermal conductivity than the insulating covering 22 is suitable. Examples of the material of the elastic bodies 41, 42 include, for example, a rubber material, a foam material, an adhesive, and a thermal interface material (TIM). Examples of a rubber material include, for example, silicone rubber, urethane rubber, acrylic rubber, nitrile rubber, butyl rubber, ethylene propylene rubber, and the like. Examples of an adhesive include, for example, an epoxy-based or silicone-based elastic adhesive. Examples of the thermal interface material include, for example, indium, silver, and other soft metals, silicone gel, an organic resin binder containing metal filler, and the like. As the material of the elastic bodies 41, 42, for example, a solid or a gel-like (half-solid) material may be used.

Detailed Configuration of Elastic Body 41

The elastic body 41 includes an inner circumferential surface opposite to the outer circumferential surface of the wire 20, an outer circumferential surface on the side opposite the inner circumferential surface of the section 31, and end surfaces 41A, 41B provided on the end portions of the elastic body 41 in the circumferential direction.

The inner circumferential surface and the outer circumferential surface of the elastic body 41 are formed extending along the outer circumferential surface of the wire 20, for example. The inner circumferential surface and the outer circumferential surface of the elastic body 41 of the present embodiment are formed with a semicircular arc-shaped lateral cross-section. For example, the inner circumferential surface of the elastic body 41 is in close contact with the outer circumferential surface of the wire 20, and the outer circumferential surface of the elastic body 41 is in close contact with the inner circumferential surface of the section 31. The inner circumferential surface of the elastic body 41, for example, is in elastic contact with the outer circumferential surface of the wire 20. The inner circumferential surface of the elastic body 41, for example, is in elastic contact with the outer circumferential surface of the wire 20 in the circumferential direction and the axis line direction in its entirety. The outer circumferential surface of the elastic body 41, for example, is in elastic contact with the inner circumferential surface of the section 31. The outer circumferential surface of the elastic body 41, for example, is in elastic contact with the inner circumferential surface of the section 31 in the circumferential direction and the axis line direction in its entirety. The section 31, for example, is thermally connected to the wire 20 via the elastic body 41. In other words, in the wire harness 10, the heat generated at the wire 20 is thermal conducted to the section 31 via the elastic body 41.

The end surfaces 41A, 41B of the elastic body 41 are provided connecting the inner circumferential surface and the outer circumferential surface of the elastic body 41. The end surfaces 41A, 41B of the elastic body 41, for example, are formed extending in a direction (the thickness direction of the elastic body 41, for example) that intersects the circumferential direction of the elastic body 41.

The elastic body 41, for example, is set with a length that is longer along the circumferential direction than that of the section 31. The end portions of the elastic body 41 in the circumferential direction, for example, are exposed from the end portions of the section 31 in the circumferential direction. In other words, the end surfaces 41A, 41B of the elastic body 41 are formed at a position projecting further toward the section 32 side in the circumferential direction than the end surfaces 31A, 31B of the section 31.

As illustrated in FIG. 3, the elastic body 41, for example, is set with a length that is longer along the axis line direction than that of the section 31. The end portions of the elastic body 41 in the axis line direction, for example, are exposed from the end portions of the section 31 in the axis line direction. For example, the end surface on the bent portion 26 side of the end surfaces of the elastic body 41 in the axis line direction is formed at a position projecting further toward the bent portion 26 side in the axis line direction than the end surface on the bent portion 26 side of the end surfaces of the section 31 in the axis line direction.

Detailed Configuration of Elastic Body 42

As illustrated in FIG. 2, the elastic body 42 includes an inner circumferential surface opposite to the outer circumferential surface of the wire 20, an outer circumferential surface on the side opposite the inner circumferential surface of the section 32, and end surfaces 42A, 42B provided on the end portions of the elastic body 42 in the circumferential direction.

The inner circumferential surface and the outer circumferential surface of the elastic body 42 are formed extending along the outer circumferential surface of the wire 20, for example. The inner circumferential surface and the outer circumferential surface of the elastic body 42 of the present embodiment are formed with a semicircular arc-shaped lateral cross-section. For example, the inner circumferential surface of the elastic body 42 is in close contact with the outer circumferential surface of the wire 20, and the outer circumferential surface of the elastic body 42 is in close contact with the inner circumferential surface of the section 32. The inner circumferential surface of the elastic body 42, for example, is in elastic contact with the outer circumferential surface of the wire 20. The inner circumferential surface of the elastic body 42, for example, is in elastic contact with the outer circumferential surface of the wire 20 in the circumferential direction and the axis line direction in its entirety. The outer circumferential surface of the elastic body 42, for example, is in elastic contact with the inner circumferential surface of the section 32. The outer circumferential surface of the elastic body 42, for example, is in elastic contact with the inner circumferential surface of the section 32 in the circumferential direction and the axis line direction in its entirety. The section 32, for example, is thermally connected to the wire 20 via the elastic body 42. In other words, in the wire harness 10, the heat generated at the wire 20 is thermal conducted to the section 32 via the elastic body 42.

The end surfaces 42A, 42B of the elastic body 42 are provided connecting the inner circumferential surface and the outer circumferential surface of the elastic body 42. The end surfaces 42A, 42B of the elastic body 42, for example, are formed extending in a direction (the thickness direction of the elastic body 42, for example) that intersects the circumferential direction of the elastic body 42.

The elastic body 42, for example, is set with a length that is longer along the circumferential direction than that of the section 32. The end portions of the elastic body 42 in the circumferential direction, for example, are exposed from the end portions of the section 32 in the circumferential direction. In other words, the end surfaces 42A, 42B of the elastic body 42 are formed at a position projecting further toward the section 31 side in the circumferential direction than the end surfaces 32A, 32B of the section 32.

As illustrated in FIG. 3, the elastic body 42, for example, is set with a length that is longer along the axis line direction than that of the section 32. The end portions of the elastic body 42 in the axis line direction, for example, are exposed from the end portions of the section 32 in the axis line direction. For example, the end surface on the bent portion 26 side of the end surfaces of the elastic body 42 in the axis line direction is formed at a position projecting further toward the bent portion 26 side in the axis line direction than the end surface on the bent portion 26 side of the end surfaces of the section 32 in the axis line direction.

Configuration of Elastic Bodies 41, 42

As illustrated in FIG. 2, the elastic body 41 and the elastic body 42 are attached to the outer circumference of the wire 20 in a state with the end surfaces 41A, 42A facing one another and the end surfaces 41A, 42A separated from one another in the circumferential direction, for example. Also, the elastic body 41 and the elastic body 42 are attached to the outer circumference of the wire 20 in a state with the end surfaces 41B, 42B facing one another and the end surfaces 41B, 42B separated from one another in the circumferential direction. In other words, the elastic bodies 41, 42 of the present embodiment are attached to the outer circumference of the wire 20 in a state where, at the end portions in the circumferential direction, the end surfaces 41A, 42A are separated from one another and the end surfaces 41B, 42B are separated from one another.

The end surface 41A of the elastic body 41 and the end surface 42A of the elastic body 42 are provided with a predetermined gap L3 therebetween in the circumferential direction. For example, the end surface 41A and the end surface 42A are provided with the gap L3 where the end surfaces 41A, 42A do not come into contact with one another. The end surface 41B of the elastic body 41 and the end surface 42B of the elastic body 42 are provided with a predetermined gap L4 therebetween in the circumferential direction. For example, the end surface 41B and the end surface 42B are provided with the gap L4 where the end surfaces 41B, 42B do not come into contact with one another. The gaps L3, L4, for example, are set to a length so that the end surfaces 41A, 42A do not come into contact with one another and the end surfaces 41B, 42B do not come into contact with one another even when the wire 20 and the outer sheath member 30 undergo thermal expansion at the maximum temperature (for example, approximately 80° C.) expected in the use environment of the vehicle V (see FIG. 1). The gap L3 may be the same length as the gap L4, for example, or may be a different length from the gap L4. Also, in the present embodiment, the gap L3 is set shorter than the gap L1, and the gap L4 is set shorter than the gap L2.

At the gap between the end surface 41A and the end surface 42A and at the gap between the end surface 41B and the end surface 42B, the outer circumferential surface of the wire 20 is not covered by the outer sheath member 30 or the elastic bodies 41, 42. Thus, at the gap between the end surfaces 41A, 42A and the gap between the end surfaces 41B, 42B, the outer circumferential surface of the wire 20 is exposed from the outer sheath member 30 and the elastic bodies 41, 42.

Looking at it a different way, the combined length of the length of the elastic body 41 in the circumferential direction and the length of the elastic body 42 in the circumferential direction is set to a length less than the length of the outer circumferential surface of the wire 20 (in this case, the insulating covering 22) in the circumferential direction.

Configuration of Fixing Member 50

The wire harness 10 includes a fixing member 50 (fastener) for fixing the outer sheath member 30 to the outer circumference of the wire 20. The fixing member 50 is provided for fixing the outer sheath member 30 to the wire 20 in a state where the sections 31, 32 of the outer sheath member 30 are tightened from outward in the radial direction against the outer circumferential surface of the wire 20. The fixing member 50, for example, is provided for fixing the sections 31, 32 and the elastic bodies 41, 42 to the outer circumference of the wire 20 in a state with the elastic bodies 41, 42 disposed between the outer circumferential surface of the wire 20 and the inner circumferential surface of the sections 31, 32.

The fixing member 50, for example, is a binding band made of a synthetic resin. The fixing member 50 includes a band-like portion 51 and a lock portion 52 integrally formed with the band-like portion 51 at the base end portion of the band-like portion 51. The lock portion 52 includes an insertion opening 53 where the band-like portion 51 can be inserted. A locking catch (not illustrated) is provided on the inner surface of the insertion opening 53. On the outer circumferential surface of the tip end portion of the band-like portion 51, a plurality of engagement grooves that extend in the width direction of the band-like portion 51 are formed at predetermined intervals in the length direction of the band-like portion 51. With the fixing member 50, the band-like portion 51 is locked in the lock portion 52 by the locking catch of the lock portion 52 being engaged with one engagement groove of the plurality of engagement grooves formed in the band-like portion 51. With the fixing member 50, the degree of tightness of the outer sheath member 30 due to the band-like portion 51 can be adjusted by adjusting the degree with which the band-like portion 51 is inserted into the lock portion 52.

The band-like portion 51 of the fixing member 50 is wound around the sections 31, 32 entirely in the circumferential direction of the wire 20 by the tip end portion being inserted into the insertion opening 53 of the lock portion 52. The band-like portion 51, for example, is wound in a manner such that it comes into contact with the outer circumferential surface of the sections 31, 32. The band-like portion 51 and the lock portion 52 are used to bind the fixing member 50 in a manner such that the outer sheath member 30 is contracted in diameter, and specifically, the space enclosed by the sections 31, 32 is made less.

The fixing member 50, for example, is formed in a manner such that the section 31 is tightened from the outside until the inner circumferential surface of the elastic body 41 comes into close contact with the outer circumferential surface of the wire 20 and the inner circumferential surface of the section 31 comes into close contact with the outer circumferential surface of the elastic body 41. Also, the fixing member 50, for example, is formed in a manner such that the section 32 is tightened from the outside until the inner circumferential surface of the elastic body 42 comes into close contact with the outer circumferential surface of the wire 20 and the inner circumferential surface of the section 32 comes into contact with the outer circumferential surface of the elastic body 42. In a tightened state, the sections 31, 32 are fixed to the outer circumference of the wire 20 with the end surfaces 31A, 32A facing one another and separated from one another and the end surfaces 31B, 32B facing one another and separated from one another. Also, in a tightened state, the elastic bodies 41, 42 are disposed between the wire 20 with the sections 31, 32 compressively deformed in the thickness direction. For example, the elastic bodies 41, 42 have elasticity that allow them to absorb amounts of contraction and amounts of expansion of the wire 20. For example, when the wire 20 contracts, the elastic bodies 41, 42 in a compressed state deform conforming to the contraction of the wire 20, and the elastic bodies 41, 42 come into elastic contact with the outer circumferential surface of the wire 20. This allows the close contact state between the inner circumferential surface of the elastic bodies 41, 42 and the outer circumferential surface of the wire 20 to be maintained when the wire 20 contracts. At this time, the fastening force from the fixing member 50 allows the close contact state between the inner circumferential surface of the sections 31, 32 and the outer circumferential surface of the elastic bodies 41, 42 to be maintained. Thus, even when the wire 20 contracts, the close contact state between the wire 20, the elastic bodies 41, 42, and the sections 31, 32 can be maintained. When the wire 20 expands, the wire 20 expands counter to the elastic force of the elastic bodies 41, 42 and the elastic bodies 41, 42 compressively deform conforming to the expansion of the wire 20, and the elastic bodies 41, 42 come into elastic contact with the outer circumferential surface of the wire 20. Thus, even when the wire 20 expands, the close contact state between the wire 20, the elastic bodies 41, 42, and the sections 31, 32 can be maintained.

As illustrated in FIG. 3, in the wire harness 10 of the present embodiment, a plurality (two in this example) of the fixing members 50 are provided at predetermined intervals in the axis line direction of the outer sheath member 30 provided on the linear portion 25. Note that regarding the outer sheath member 30 provided on the linear portion 27, in a similar manner, the outer sheath member 30 and the elastic bodies 41, 42 are fixed to the outer circumference of the wire 20 by the fixing member 50.

Advantageous Effects

Next, the advantageous effects of the present embodiment will be described.

1. The fixing member 50 fixes the outer sheath member 30 (the sections 31, 32) to the outer circumference of the wire 20 with at least one end surface 31A of the section 31 in the circumferential direction and at least one end surface 32A of the section 32 in the circumferential direction facing one another and separated from one another.

According to this configuration, a gap is formed between the section 31 and the section 32, and a portion of the outer circumferential surface of the wire 20 is exposed from the outer sheath member 30 at this gap. This allows the heat generated at the wire 20 to be dissipated outside of the outer sheath member 30 from the gap between the section 31 and the section 32. In this manner, compared to a configuration in which the outer circumference of the wire 20 is entirely enclosed by an outer sheath member in the circumferential direction, the heat generated at the wire 20 can be suppressed from being trapped inside the outer sheath member 30, and the heat generated at the wire 20 can be efficiently dissipated to the atmosphere outside the outer sheath member 30 from the gap described above. Thus, the heat generated at the wire 20 can be efficiently dissipated, and the heat dissipation of the wire harness 10 can be enhanced.

2. Because the outer sheath member 30 is constituted by a plurality of sections 31, 32, the sections 31, 32 can be easily shaped in a shape conforming to the outer circumference of the wire 20. Also, the wire 20 is sandwiched by the plurality of sections 31, 32, and this state is fixed by the fixing member 50. In this manner, compared to a configuration in which the wire 20 is brought into contact with the inner circumferential surface of an outer sheath member with a closed circular lateral cross-sectional shape, the adhesion between the wire 20 and the sections 31, 32 can be enhanced. Furthermore, even in a case where the wire harness 10 vibrates or swings, because the state of the wire 20 being sandwiched by the plurality of sections 31, 32 can be maintained via fixing via the fixing member 50, a decrease in the adhesion between the wire 20 and the sections 31, 32 can be minimized or prevented. Accordingly, a decrease in the heat dissipation of the wire harness 10 can be suppressed.

3. Because the gap is provided between the section 31 and the section 32, the sections 31, 32 can deform and move in the circumferential direction. Thus, the sections 31, 32 can deform and move conforming to the deformation of the wire 20 when the wire 20 expands or contracts. Thus, even when the wire 20 expands or contracts, a decrease in the adhesion between the wire 20 and the sections 31, 32 can be minimized or prevented. Accordingly, a decrease in the heat dissipation of the wire harness 10 can be suppressed.

4. The elastic body 41 is provided between the inner circumferential surface of the section 31 and the outer circumferential surface of the wire 20. The elastic body 41 is in close contact with the outer circumferential surface of the wire 20 and is in close contact with the inner circumferential surface of the section 31. The elastic body 41 is made from a material with a lower elastic modulus than the section 31 and with a higher thermal conductivity than an air layer.

According to this configuration, the elastic body 41 made from a material with a lower elastic modulus than the section 31 is provided between the section 31 and the wire 20. By the elastic body 41 elastically deforming, it can absorb the expansion and the contraction of the wire 20. In this manner, compared to a configuration in which the section 31 comes into direct contact with the outer circumferential surface of the wire 20, when the wire 20 expands or contracts, the close contact state between the section 31 and the wire 20 with the elastic body 41 disposed therebetween can be maintained. This can prevent an air layer, i.e., a heat insulating layer, being formed between the outer circumferential surface of the wire 20 and the inner circumferential surface of the section 31. As a result, the thermal resistance between the outer circumferential surface of the wire 20 and the inner circumferential surface of the section 31 can be decreased. Thus, the heat generated at the wire 20 can be suppressed from being trapped inside the outer sheath member 30, and the heat generated at the wire 20 can be dissipated efficiently to the atmosphere from the outer circumferential surface of the section 31. Thus, the heat generated at the wire 20 can be efficiently dissipated, and the heat dissipation of the wire harness 10 can be enhanced.

4. The elastic body 41 made from a material with a lower elastic modulus than the section 31 is provided between the section 31 and the wire 20. In this manner, compared to a configuration in which the section 31 is directly pressed against the outer circumferential surface of the wire 20, damage to the insulating covering 22 of the wire 20 can be minimized or prevented.

5. The wire 20 includes the core wire 21 and the insulating covering 22 that covers the outer circumference of the core wire 21. The elastic body 41 is made from a material with a higher thermal conductivity than the insulating covering 22. According to this configuration, the thermal resistance between the outer circumferential surface of the insulating covering 22 and the inner circumferential surface of the section 31 can be further decreased. In this manner, the heat generated at the wire 20 can be efficiently thermally conducted to the section 31 via the elastic body 41. Thus, the heat generated at the wire 20 can be dissipated efficiently to the atmosphere from the outer circumferential surface of the section 31, and the heat dissipation of the wire harness 10 can be enhanced.

6. The section 31 is made from a metal material. The length of the elastic body 41 in the circumferential direction is greater than the length of the section 31 in the circumferential direction. The end portions of the elastic body 41 in the circumferential direction are exposed from the end portions of the section 31 in the circumferential direction. According to this configuration, because the edges of the ends in the circumferential direction of the section 31 made from a metal material come into contact with the elastic body 41, damage by the edges to the outer circumferential surface of the wire 20 can be minimized or prevented.

7. In a case where the section 31 is made from a metal material, radiant heat from the wire 20 is reflected at the inner circumferential surface (i.e., the metal surface) of the section 31, thus making it easier for the heat to be trapped inside the outer sheath member 30. Thus, in a case where the section 31 is made of a metal material, the first effect described above is particularly pronounced.

8. The length of the elastic body 41 in the axis line direction is greater than the length of the section 31 in the axis line direction. The end portions of the elastic body 41 in the axis line direction are exposed from the end portions of the section 31 in the axis line direction. According to this configuration, because the edges of the ends in the axis line direction of the section 31 come into contact with the elastic body 41, damage by the edges to the outer circumferential surface of the wire 20 can be minimized or prevented.

9. The wire 20 includes the linear portion 25 and the bent portion 26 provided on one end portion of the linear portion 25. The section 31 is provided on the portion of the linear portion 25 closer to the bend inner side 26A of the bent portion 26. The section 32 is provided on the portion of the linear portion 25 closer to the bend outer side 26B of the bent portion 26. The end surface on the bent portion 26 side of the end surfaces of the section 31 in the axis line direction is provided at a position further separated from the bent portion 26 than the end surface on the bent portion 26 side of the end surfaces of the section 32 in the axis line direction.

According to this configuration, the end surface of the section 31 provided at the portion closer to the bend inner side 26A of the bent portion 26 is provided at a position separated from the bend inner side 26A. Thus, in a case where the wire harness 10 vibrates or swings, for example, the bent portion 26 (in particular, the bend inner side 26A) of the wire 20 can be prevented from coming into contact with the end surface of the section 31 in the axis line direction. In this manner, damage to the outer circumferential surface of the wire 20 can be suitably minimize or prevented.

10. Furthermore, because the end surface of the section 31 provided at the portion closer to the bend inner side 26A of the bent portion 26 is provided at a position separated from the bend inner side 26A, the ease of the process of bending the wire 20 can be enhanced.

OTHER EMBODIMENTS

The following modifications can be made to the embodiment described above. The embodiment described above and the following modified examples can be implemented in any combination within a technically consistent range.

In the embodiment described above, the fixing member 50 is implemented via a binding band made of synthetic resin. However, no such limitation is intended. As the fixing member 50, for example, a metal band or adhesive tape may be used. Also, as the fixing member 50, a fixing member including a fixing portion (second fastener) that fixes to the vehicle body of the vehicle V, for example, may be used.

Figure 4:
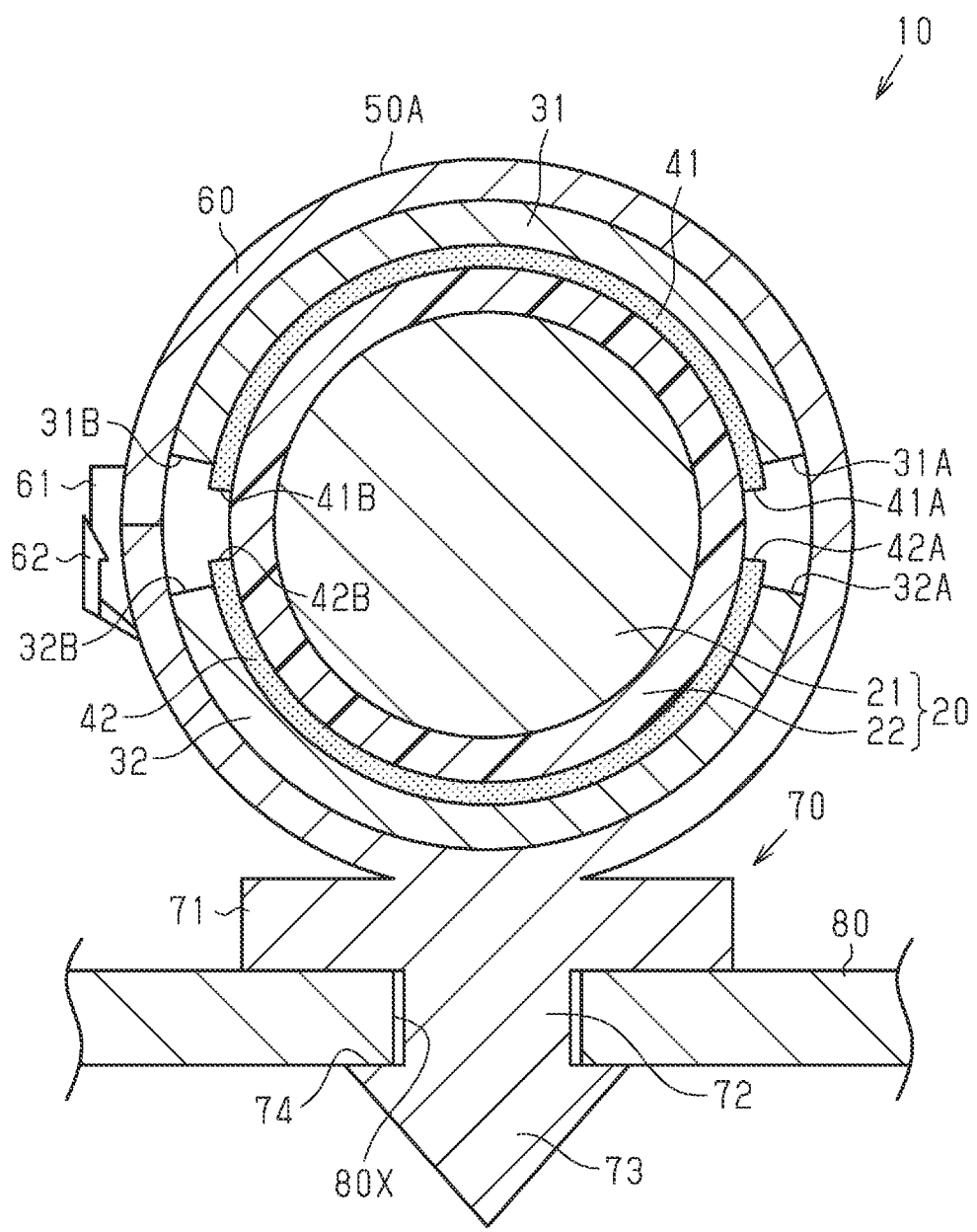
FIG. 4 is a schematic transverse cross-sectional view illustrating a wire harness according to a modified example.

For example, as illustrated in FIG. 4, instead of the fixing member 50 illustrated in FIG. 2, a fixing member 50A may be used. The fixing member 50A includes a holding portion 60 that holds at least the wire 20 and the sections 31, 32 and a fixing portion 70 that is fixed to a vehicle body panel 80, i.e., a fixing target portion.

The holding portion 60 has an overall tube-like shape (a cylindrical shape in this example) with a size that is able to house the outer sheath member 30. The holding portion 60 can be put in an open state by releasing the engagement between a lock portion 61 and a lock target portion 62, which are configured to engage with one another. By opening the holding portion 60, the wire 20, the outer sheath member 30, and the like can be fitted inside the holding portion 60. Also, with the fixing member 50A, by closing the holding portion 60, the wire 20, the outer sheath member 30, and the like can be held inside the holding portion 60. The fixing member 50A is locked by engaging the lock portion 61 and the lock target portion 62 together and putting the holding portion 60 in the closed state. With the holding portion 60 is a locked state, the holding portion 60 can produce a predetermined fastening force against the outer sheath member 30. For example, with the holding portion 60 in a locked state, the section 31 is tightened from the outside until the inner circumferential surface of the elastic body 41 comes into close contact with the outer circumferential surface of the wire 20 and the inner circumferential surface of the section 31 comes into close contact with the outer circumferential surface of the elastic body 41. With the holding portion 60 in a locked state, the sections 31, 32 are fixed to the outer circumference of the wire 20 with the end surfaces 31A, 32A facing one another and separated from one another and the end surfaces 31B, 32B facing one another and separated from one another. Also, with the holding portion 60 in a locked state, the elastic bodies 41, 42 are disposed between the wire 20 with the sections 31, 32 compressively deformed in the thickness direction.

The fixing portion 70 is formed on a portion on the outer circumferential surface of the holding portion 60, for example. The fixing portion 70 is provided at a position on the outer circumferential surface of the holding portion 60 separated from the lock portion 61 and the lock target portion 62 in the circumferential direction.

The fixing portion 70 includes a base portion 71, a support shaft 72, and an engagement portion 73 formed on the tip end of the support shaft 72. The base portion 71, for example, is integrally formed with the holding portion 60. The support shaft 72, for example, is integrally formed with the base portion 71. The engagement portion 73, for example, is integrally formed with the support shaft 72. The fixing member 50A of the present modified example, is a single component including the holding portion 60, the base portion 71, the support shaft 72, and the engagement portion 73 continuously and integrally formed. A synthetic resin, such as polyolefin, polyamide, polyester, or ABS resin, may be used as the material of the holding portion 60 and the fixing portion 70, for example. A metal material, such as an iron-based material or an aluminum-based material may be used as the material of the holding portion 60 and the fixing portion 70, for example.

The base portion 71, for example, is integrally formed in a disk shape. The support shaft 72 is formed on a central portion of the surface (lower surface in this example) of the base portion 71 on the opposite side from the holding portion 60. The support shaft 72 is connected to the lower surface of the base portion 71 at its base end portion. The support shaft 72 is formed extending from the lower surface of the base portion 71 in the direction away from the holding portion 60. The support shaft 72, for example, is formed in a cylindrical shape. The engagement portion 73 is formed on the tip end portion of the support shaft 72. The engagement portion 73 is formed projecting sideward from the tip end of the support shaft 72. The engagement portion 73 is formed projecting sideward from the entire circumference in the circumferential direction of the tip end of the support shaft 72, for example. The engagement portion 73, for example, is formed in a cone shape. The engagement portion 73 is formed in a manner allowing it to be insert and to engage with an installation hole 80X formed in the vehicle body panel 80. Specifically, the engagement portion 73 is configured to be elastically deformable so that the engagement portion 73 can be inserted into the installation hole 80X and can engage with the vehicle body panel 80 at the edge of the installation hole 80X after being inserted in the installation hole 80X. Note that the installation hole 80X, for example, is formed in a circular shape in a plan view.

The engagement portion 73 has a width at the widest portion in the direction orthogonal to the extension direction of the support shaft 72, in this example, the diameter of a cone-like bottom surface 74, that is greater than the opening diameter of the installation hole 80X. The engagement portion 73 is configured to be elastically deformable so that the diameter of the bottom surface 74 can deform to a value equal to or less than the opening diameter of the installation hole 80X.

When the engagement portion 73 is inserted into the installation hole 80X, the engagement portion 73 elastically deforms, with the diameter of the cone-like bottom surface 74 decreasing, as it advances inside the installation hole 80X. Then, when the engagement portion 73 passes all the way through the installation hole 80X, the engagement portion 73 elastically returns to its original shape, and the bottom surface 74 of the engagement portion 73 engages with the edge of the installation hole 80X. In this manner, the fixing member 50A is fixed to the vehicle body panel 80, and the outer sheath member 30, the wire 20, and the like held by the fixing member 50A are fixed to the vehicle body panel 80. At this time, the lower surface of the base portion 71 is in contact with the vehicle body panel 80, for example.

According to this configuration, the heat generated at the wire 20 can pass through the outer sheath member 30 and the fixing member 50A and be efficiently transferred to the vehicle body panel 80 with a large surface area. Thus, the heat generated at the wire 20 can be efficiently dissipated, and the heat dissipation of the wire harness 10 can be enhanced.

In the modified example illustrated in FIG. 4, the fixing target portion is implemented via the vehicle body panel 80. However, no such limitation is intended. For example, the fixing target portion may be implemented via a bracket attached to the vehicle body panel. Also, the fixing target portion may be implemented via the outer surface of a case of an electric device installed in the vehicle V.

The fixing member 50 according to the embodiment described above may be formed having elasticity allowing it to absorb amounts of expansion and amounts of contraction of the wire 20. In this case, the elastic bodies 41, 42 may be omitted.

In the embodiment described above, the length of the section 31 in the axis line direction and the length of the section 32 in the axis line direction are set to different lengths. However, no such limitation is intended. For example, the length of the section 31 in the axis line direction may be set to the same length as the length of the section 32 in the axis line direction. In this case, the section 31 and the section 32 may be fixed to the wire 20 offset from one another in the axis line direction of the wire 20.

In the embodiment described above, the end portions of the elastic body 41 in the axis line direction are exposed from the end portions of the section 31 in the axis line direction. However, no such limitation is intended. For example, only one end portion of the elastic body 41 in the axis line direction may be exposed from the section 31. Also, both end portions of the elastic body 41 in the axis line direction may not be exposed from the section 31.

In the embodiment described above, the end portions of the elastic body 41 in the circumferential direction are exposed from the end portions of the section 31 in the circumferential direction. However, no such limitation is intended. For example, only one end portion of the elastic body 41 in the circumferential direction may be exposed from the section 31. Also, both end portions of the elastic body 41 in the circumferential direction may not be exposed from the section 31.

In the embodiment described above, the entire inner circumferential surface of the elastic body 41 is brought into close contact with the outer circumferential surface of the wire 20. However, no such limitation is intended. For example, a portion of the inner circumferential surface of the elastic body 41 may not be in close contact with the outer circumferential surface of the wire 20.

In the embodiment described above, the outer circumferential surface elastic body 41 is brought into close contact with the entire inner circumferential surface of the section 31. However, no such limitation is intended. For example, a portion of the inner circumferential surface of the section 31 may not be in close contact with the outer circumferential surface of the elastic body 41.

The elastic body 41 of the embodiment described above may be omitted. In this case, for example, the inner circumferential surface of the section 31 comes into direct contact with the outer circumferential surface of the wire 20.

In the embodiment described above, the end portions of the elastic body 42 in the axis line direction are exposed from the end portions of the section 32 in the axis line direction. However, no such limitation is intended. For example, only one end portion of the elastic body 42 in the axis line direction may be exposed from the section 32. Also, both end portions of the elastic body 42 in the axis line direction may not be exposed from the section 32.

In the embodiment described above, the end portions of the elastic body 42 in the circumferential direction are exposed from the end portions of the section 32 in the circumferential direction. However, no such limitation is intended. For example, only one end portion of the elastic body 42 in the circumferential direction may be exposed from the section 32. Also, both end portions of the elastic body 42 in the circumferential direction may not be exposed from the section 32.

In the embodiment described above, the entire inner circumferential surface of the elastic body 42 is brought into close contact with the outer circumferential surface of the wire 20. However, no such limitation is intended. For example, a portion of the inner circumferential surface of the elastic body 42 may not be in close contact with the outer circumferential surface of the wire 20.

In the embodiment described above, the outer circumferential surface elastic body 42 is brought into close contact with the entire inner circumferential surface of the section 32. However, no such limitation is intended. For example, a portion of the inner circumferential surface of the section 32 may not be in close contact with the outer circumferential surface of the elastic body 42.

The elastic body 42 of the embodiment described above may be omitted. In this case, for example, the inner circumferential surface of the section 32 comes into direct contact with the outer circumferential surface of the wire 20.

In the embodiment described above, the elastic bodies 41, 42 are provided between the sections 31, 32 and the wire 20. However, no such limitation is intended.

Figure 5:
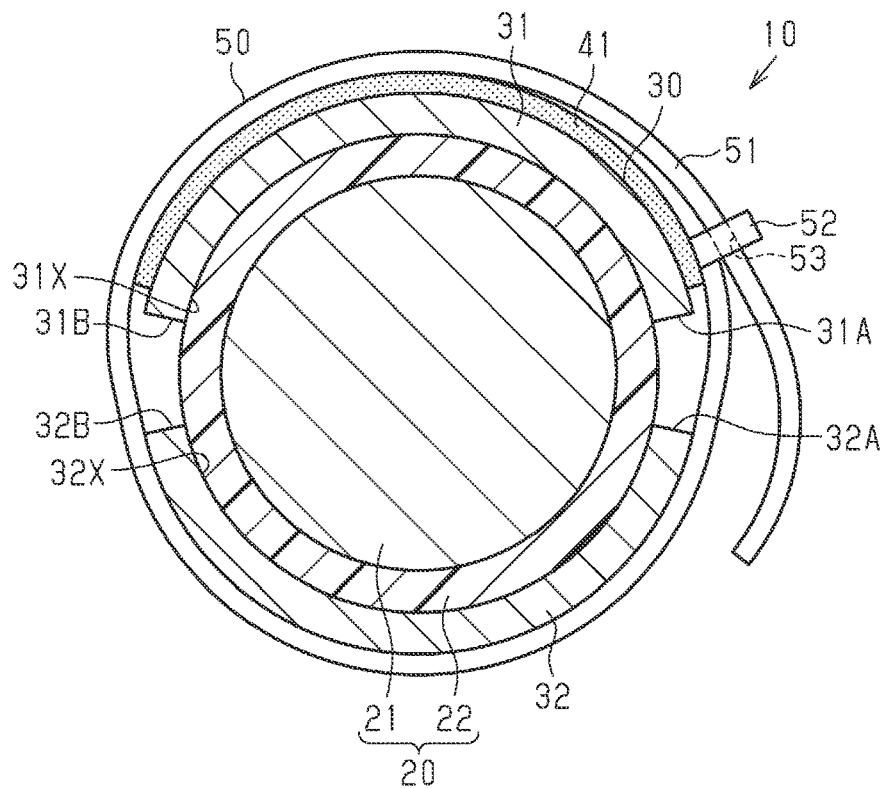
FIG. 5 is a schematic transverse cross-sectional view illustrating a wire harness according to a modified example.

For example, as illustrated in FIG. 5, the elastic body 41 may be provided on the outer circumferential surface of the section 31. In this case, the elastic body 41 is tightened from the outer side by the fixing member 50, bringing the inner circumferential surface of the elastic body 41 into close contact with the outer circumferential surface of the section 31. Via this fastening force, the elastic body 41 presses the section 31 toward the wire 20. In this manner, the degree of close contact between the outer circumferential surface of the wire 20 and the inner circumferential surface of the section 31 can be increased. Also, by the elastic body 41 elastically deforming, it can absorb amounts of expansion and amounts of contraction of the wire 20.

In the modified example illustrated in FIG. 5, the elastic body 42 may be further provided on the outer circumferential surface of the section 32. Also, the elastic bodies 41, 42 may also be provided between the sections 31, 32 and the wire 20.

In the modified example illustrated in FIG. 5, the elastic body 41 may be implemented via a coil spring or a plate spring, for example.

In the embodiment described above, the sections 31, 32 are attached to the outer circumference of the wire 20 in a state where, at the end portions in the circumferential direction, the end surfaces 31A, 32A are separated from one another and the end surfaces 31B, 32B are separated from one another. However, no such limitation is intended.

Figure 6:
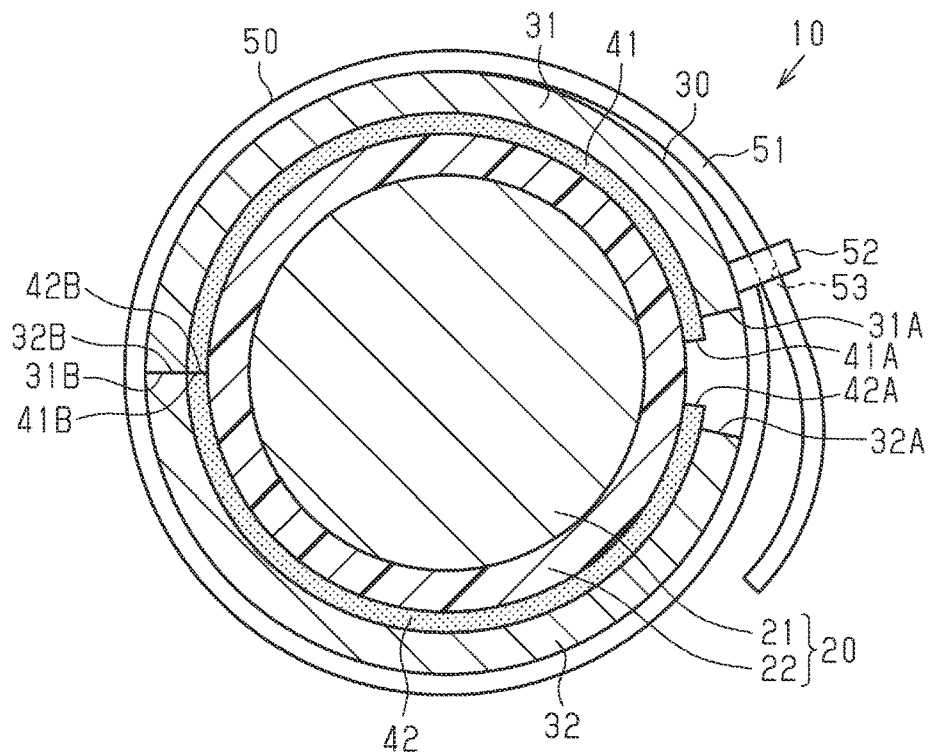
FIG. 6 is a schematic transverse cross-sectional view illustrating a wire harness according to a modified example.

For example, as illustrated in FIG. 6, the sections 31, 32 may be attached to the outer circumference of the wire 20 in a state where, at one end of the sections 31, 32 in the circumferential direction, the end surfaces 31B, 32B are in contact with one another. Even in this case, the sections 31, 32 are attached to the outer circumference of the wire 20 in a state where the end surfaces 31A, 32A face one another and are separated from one another. Note that in the present modified example, the end surfaces 41B, 42B of the elastic bodies 41, 42 are in contact with one another.

In the embodiment described above, the outer sheath member 30 is constituted by the two sections 31, 32. However, the number of sections that constitute the outer sheath member 30 is not particularly limited. For example, the outer sheath member 30 may be constituted by three or more sections.

An electromagnetic shield member may be provided on the inner side of the outer sheath member 30 of the embodiment described above. The electromagnetic shield member may be provided between the inner circumferential surface of the sections 31, 32 and the outer circumferential surface of the wire 20, for example. As the electromagnetic shield member, for example, a flexible braided wire or metal foil may be used.

An electromagnetic shield member may be provided on the outer side of the outer sheath member 30 of the embodiment described above. In a case where a plurality of the wires 20 are routed side by side, an electromagnetic shield member may be provided enclosing all of the wires 20.

In the embodiment described above, the wire harness 10 includes an electromagnetic shielding function. However, the wire harness may not include an electromagnetic shielding function.

In the embodiment described above, the number of the wires 20 included in the wire harness 10 is not particularly limited, and the number of wires 20 may be changed depending on the specifications of the vehicle V. For example, in another configuration, a low voltage wire for connecting a low voltage battery and low voltage devices (for example, a lamp, car audio, and the like) may be added as a wire included in the wire harness 10.

The arrangement relationship between the inverter 11 and the high voltage battery 12 in the vehicle V is not limited by the embodiment described above and may be changed as appropriate depending on the vehicle configuration.

In the embodiment described above, the inverter 11 and the high voltage battery 12 are used as the electric devices connected by the wire 20. However, no such limitation is intended. For example, a wire may be used to connect the inverter 11 and a motor for driving the wheels. In other words, the present disclosure is applicable to any device that electrically connects electric devices installed in a vehicle.

The sections 31, 32 may be deformable, with the opening portions 31X, 32X of the sections 31, 32 increasing in width. According to this configuration, the section 31 can be attached to the outer circumferential surface of the wire 20, directly on the outer circumferential surface of the wire 20 or with the elastic body 41 disposed therebetween, in a state where the opening portion 31X of the section 31 has a temporary elastically increased width. The section 31 is temporarily held on the outer circumferential surface of the wire 20 or on the elastic body 41 by the elastic restoring force of the section 31. The same applies to the section 32. Thus, when fixing the sections 31, 32 on the wire 20 using the fixing member 50, the worker can fix the sections 31, 32 without using their hands to press the sections 31, 32 toward the wire 20 or the elastic bodies 41, 42 and use the fixing member 50 to fix the sections 31, 32 without holding onto them.

The embodiments disclosed herein are examples in all respects and should not be interpreted as limiting in any manner. The scope of the present disclosure is defined not by the foregoing description, but by the scope of the claims, and all modifications that are equivalent to or within the scope of the claims are included.

The invention claimed is:

1. A wire harness, comprising:
a wire;
an outer sheath that covers a portion of an outer circumferential surface of the wire in a circumferential direction;
a fastener that fixes the outer sheath to an outer circumference of the wire, wherein:
the outer sheath includes a first section and a second section that each include an opening that opens in a direction orthogonal to an axis line direction of the wire, and
the fastener fixes the outer sheath to the outer circumference of the wire with at least one end surface of the first section in the circumferential direction and at least one end surface of the second section in the circumferential direction facing one another and separated from one another; and
a first elastic body provided between an inner circumferential surface of the first section and the outer circumferential surface of the wire, wherein:

the first elastic body is in close contact with the outer circumferential surface of the wire and in close contact with the inner circumferential surface of the first section, the first elastic body is made from a material with a lower elastic modulus than the first section, and the first elastic body is made from a material with a higher thermal conductivity than an air layer.

2. The wire harness according to claim 1, wherein:

the wire includes a core wire and an insulating covering that covers an outer circumference of the core wire, and the first elastic body is made from a material with a higher thermal conductivity than the insulating covering.

3. The wire harness according to claim 1, wherein:

the first section is made from a metal material, a length of the first elastic body in the circumferential direction is greater than a length of the first section in the circumferential direction, and ends of the first elastic body in the circumferential direction are exposed from ends of the first section in the circumferential direction.

4. The wire harness according to claim 3, wherein a length of the first elastic body in the axis line direction is greater than a length of the first section in the axis line direction, and ends of the first elastic body in the axis line direction are exposed from ends of the first section in the axis line direction.

5. The wire harness according to claim 1, further comprising:

a second elastic body provided between an inner circumferential surface of the second section and the outer circumferential surface of the wire, wherein:

the second elastic body is in close contact with the outer circumferential surface of the wire and in close contact with the inner circumferential surface of the second section, the second elastic body is made from a material with a lower elastic modulus than the second section, and the second elastic body is made from a material with a higher thermal conductivity than an air layer.

6. A wire harness, comprising:

a wire;

an outer sheath that covers a portion of an outer circumferential surface of the wire in a circumferential direction;

a fastener that fixes the outer sheath to an outer circumference of the wire, wherein:

the outer sheath includes a first section and a second section that each include an opening that opens in a direction orthogonal to an axis line direction of the wire, and the fastener fixes the outer sheath to the outer circumference of the wire with at least one end surface of the first section in the circumferential direction and at least one end surface of the second section in the circumferential direction facing one another and separated from one another; and an elastic body provided on an outer circumferential surface of the first section, wherein:

the elastic body is configured to press the first section toward the wire, and the elastic body is made from a material with a lower elastic modulus than the first section.

7. The wire harness according to claim 6, wherein the wire includes a linear portion and a bent portion provided on one end of the linear portion, the first section is provided at a portion of the linear portion closer to a bend inner side of the bent portion, the second section is provided at a portion of the linear portion closer to a bend outer side of the bent portion, and an end surface on the bent portion side of end surfaces of the first section in the axis line direction is provided at a position further separated from the bent portion than an end surface on the bent portion side of end surfaces of the second section in the axis line direction.

8. The wire harness according to claim 1, wherein the fastener includes:

a holder that holds the wire and the outer sheath; and a second fastener provided connected to the holder, the second fastener being configured to be fixed to a fixing target.

\* \* \* \* \*